Inventor
Michael J. Schlitters
By
J. S. Murray
Attorney

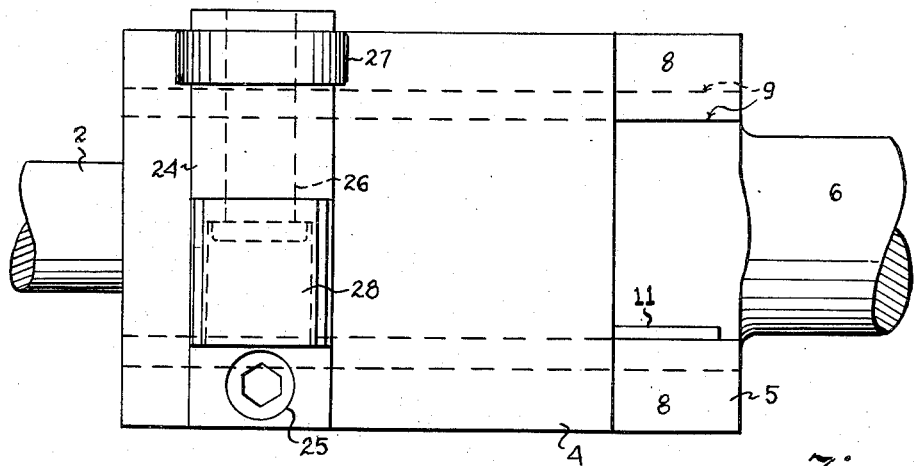
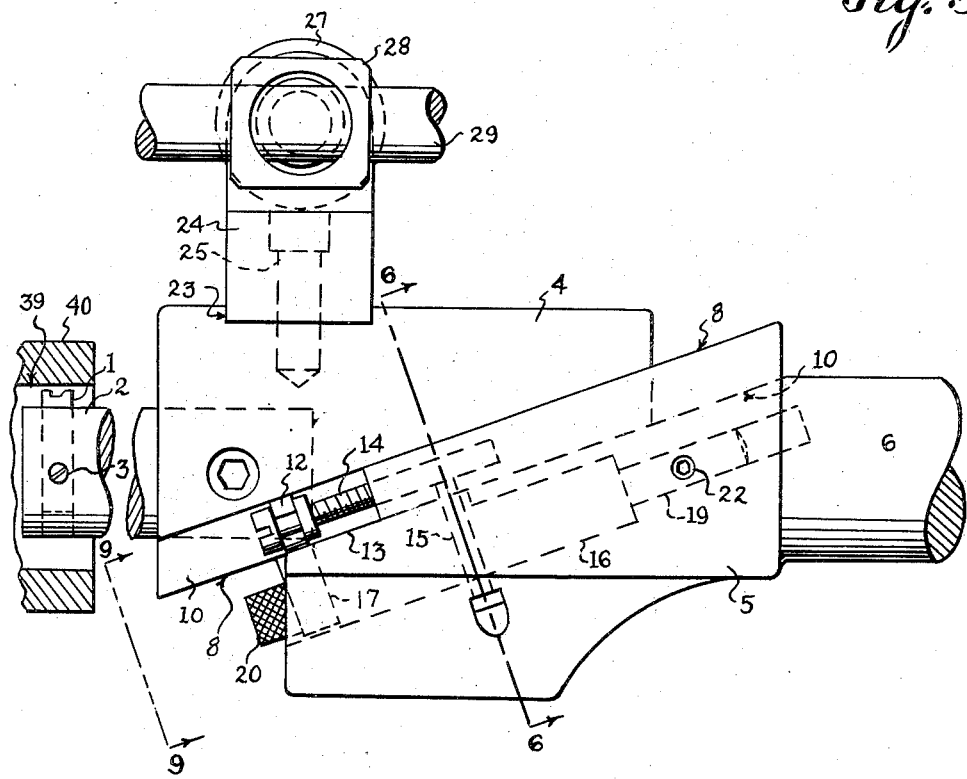

Jan. 24, 1950
M. J. SCHLITTERS
2,495,291
RECESSING TOOL HOLDER
Filed May 25, 1945
4 Sheets-Sheet 4
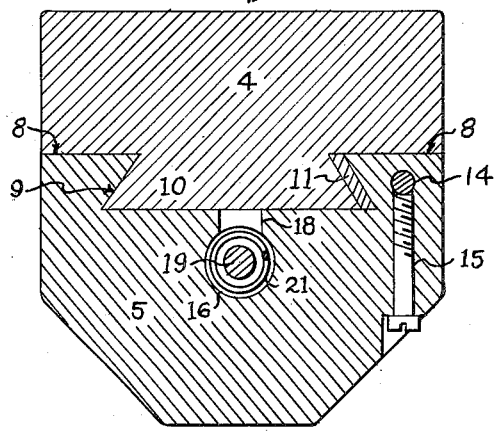
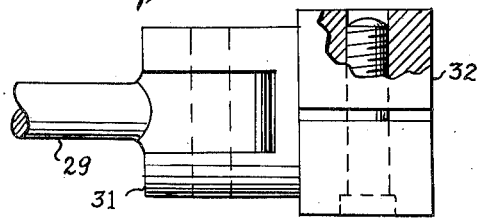
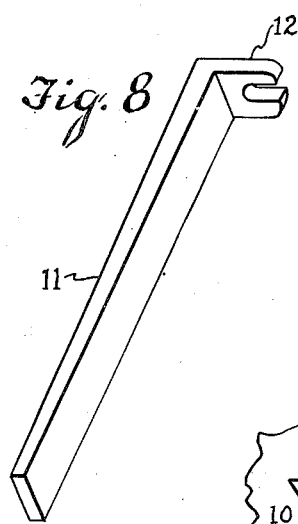
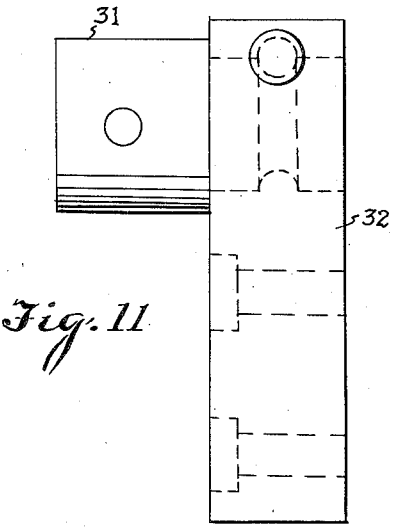
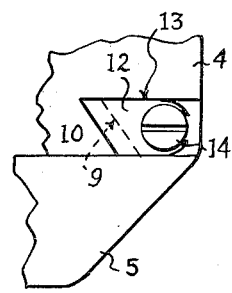
Inventor
Michael J. Schlitters
By J. S. Murray
Attorney Patented Jan. 24, 1950

2,495,291

UNITED STATES PATENT OFFICE 2,495,291

RECESSING TOOL HOLDER

Michael J. Schlitters, Grosse Pointe Park, Mich.

Application May 25, 1945, Serial No. 595,693

4 Claims. (Cl. 77—58)

This invention relates to recessing tool holders and particularly holders for recessing tools for screw machine use.

Recessing tool holders as heretofore constructed are not suited to maintain close tolerances incident to highly accurate machining, and it has commonly been necessary to complete internally cut recesses with finishing tools to establish precise dimensions.

An object of the invention is to provide a recessing tool holder avoiding such lost motion and flexibility of parts as has prevented deriving close accuracy from prior tool holders for a like purpose.

Another object is to so design a tool holder as to adapt a recessing tool in such holder to perform internal facing and forming operations.

Another object is to adapt a recessing tool holder to be readily and accurately adjusted to increase or diminish the distance of its working path from the axis of a sliding cam-type support for such holder.

Another object is to improve a recessing tool holder of the type adapted to be laterally cammed on a sliding support, the camming being effected through a continued sliding advance of the support after a stop has taken effect on the holder, the improvement consisting in equipping the holder with a bracket adapting two different types of stop means to be selectively employed.

These and various other objects are attained by the construction hereinafter described and illustrated in the accompanying drawings, wherein:

Fig. 3 is a top plan view of the improved tool holder.

Fig. 4 is a side elevational view of the same.

Fig. 6 is a cross sectional view taken on the line 6—6 of Fig. 4.

Fig. 8 is a perspective view of a gib employed by the tool.

Fig. 9 is a fragmentary front view, the direction of sight being parallel to the interengaged cam faces of the holder, as indicated by the line 9—9 of Fig. 4.

Fig. 10 is a top plan view of an anchorage bracket for a stop rod.

Fig. 11 is a view of said bracket in side elevation.

Figure 1:
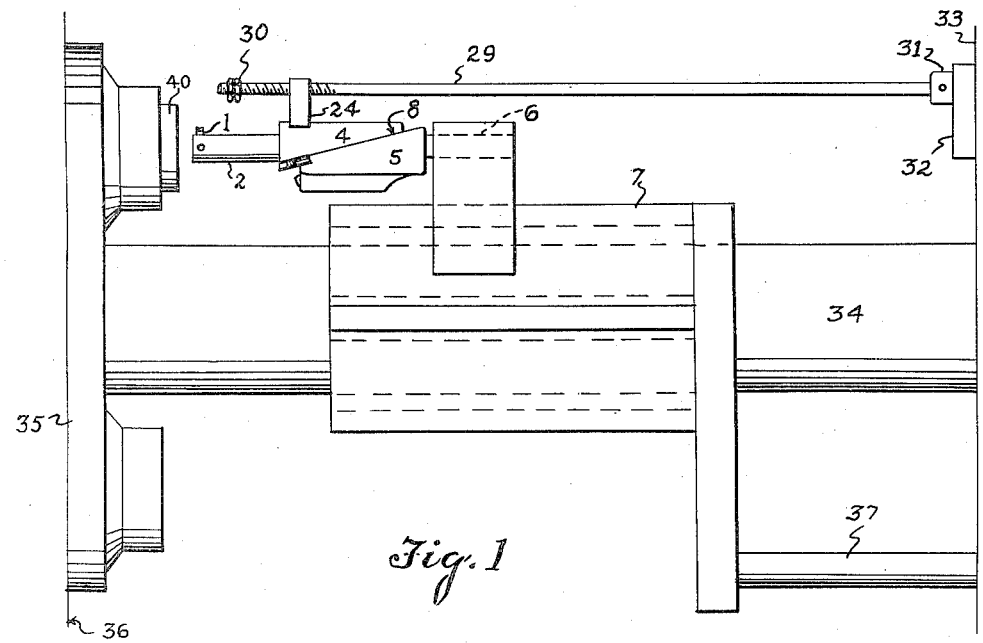
Fig. 1 is a fragmentary side elevational view of a screw machine to which my improved holder is applied.

In these views, the reference character 1 designates a recessing cutter which may be designed to meet requirements of any particular job. The illustrated cutter is radially set into the forward end of a cutter bar 2 and is clamped therein by a screw 3. The bar 2 is socketed in and forwardly projects from the upper member 4 of a two-part holder 4, 5, the lower member 5 of which has a rearwardly extending shank 6 to mount the holder on any suitable slide 7.

The members 4 and 5 have interengaging plane cam faces 8 seating and supporting the upper member on the lower one and rearwardly diverging from the direction of advance and retraction of the tool at an angle preferably approximating twenty degrees. The face 8 of the lower member is longitudinally and centrally formed with a groove 9 having its opposed walls undercut to mate with a dove-tailed tongue 10 carried by and beneath the upper member, the two members being thus held interengaged and the upper member being accurately guided in sliding along the faces 8. To provide for accurately taking up wear, it is preferred to equip the lower member with a tapered gib 11 interposed between the tongue 10 and one of the undercut walls of the groove 9, the thicker end of said gib having a lug 12 entered in a recess 13 laterally opening in the front end of the lower member, a headed adjusting screw 14 being extended through said lug parallel to the faces 8 and threaded into the lower member. When any looseness develops the gib is adjusted rearwardly until a close sliding fit is again established. A set screw 15 threaded in the lower member may be tightened against the screw 14 to maintain any adjustment of the latter.

Extending rearwardly in the lower member from its front end is a bore 16 parallel and adjacent to the bottom of the groove 9 and a lug 17 on the upper member projects into said bore, the forward portion of the latter being cut through to the groove bottom, as indicated at 18 to allow forward and back travel of the lug as the upper member slides on the lower one. Extending through the bore 16 and through the lug 17 is an elongated screw 19 threaded into the lower member rearwardly of the bore and formed on its front and with a head 20 as a stop for the lug 17. Coiled on the screw 19 and compressed between said lug and the rear end of said bore is a spring 21 urging the upper member forward with considerable force, response of such member being limited by the head 20. A screw 22 laterally set into the lower member terminally engages the threaded rear portion of the screw 19 to maintain its adjustment.

Surmounting the upper member of the tool holder and set into a groove 23 extending across such member is a bracket 24 rigidly secured by two screws 25. An extra socket 25a for said screws opens in the groove 23 so that when desired, the bracket may be reversed end for end in said groove. Fixed in said bracket transversely of the holder 4, 5 is a pin 26, having journaled on its respective end portions a roller 27 and a hollow block 28. As per Fig. 1, the forward portion of a stop rod 29 extends freely through the block 28, said rod having an adjustable stop nut 30 in front of the block. Rearward extent of the rod 29 is sufficient to afford its pivotal engagement with a head 31 slotted to receive the rod and swiveled in a bracket 32 transversely to the pivot afforded the rod in said head. Said bracket is carried by the frame 33 of the screw machine, and affords the rod a limited universal pivotal play.

Figure 2:
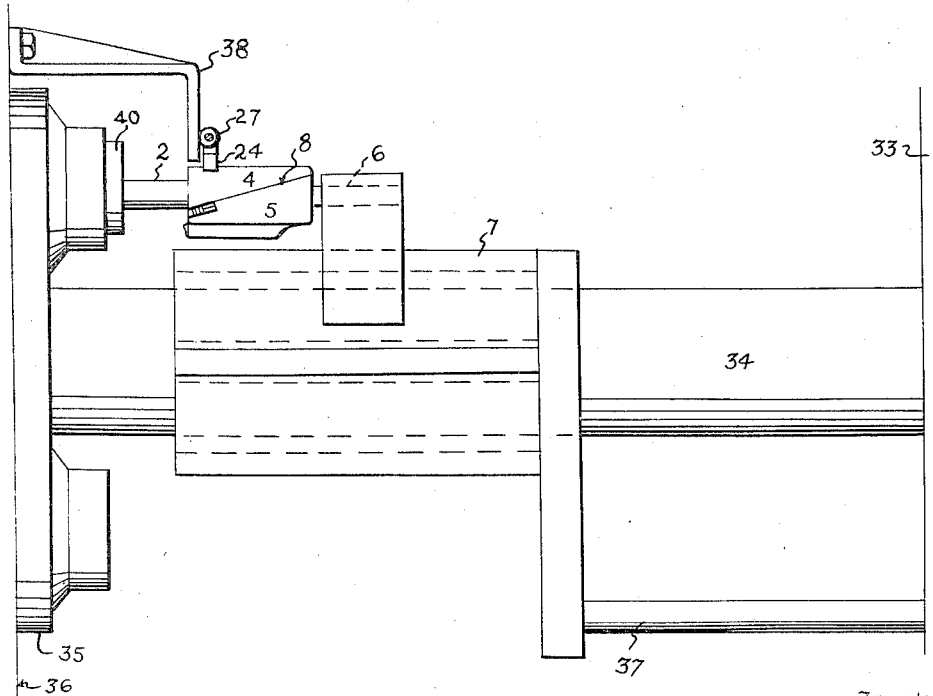
Fig. 2 is a similar view showing a different position of the holder and a different stop for initiating the recess-forming travel of the cutter.
Figure 5:
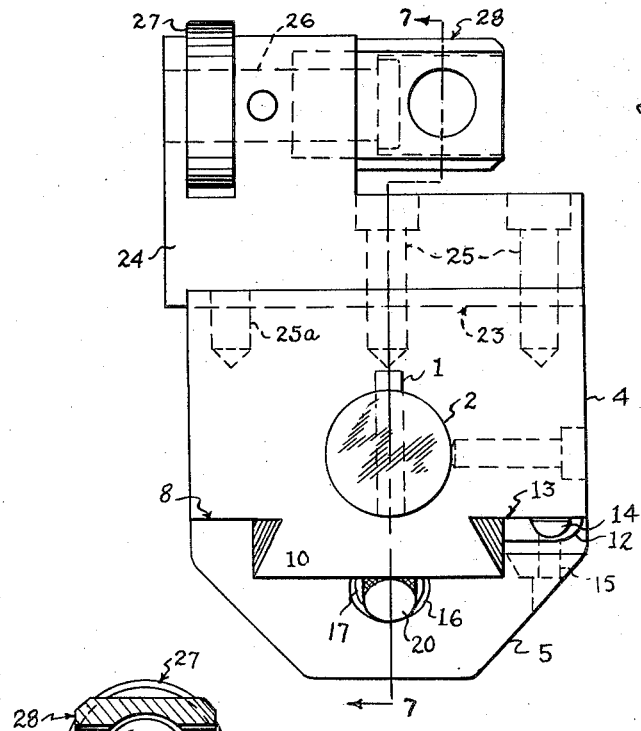
Fig. 5 is a front end view of the holder.
Figure 7:
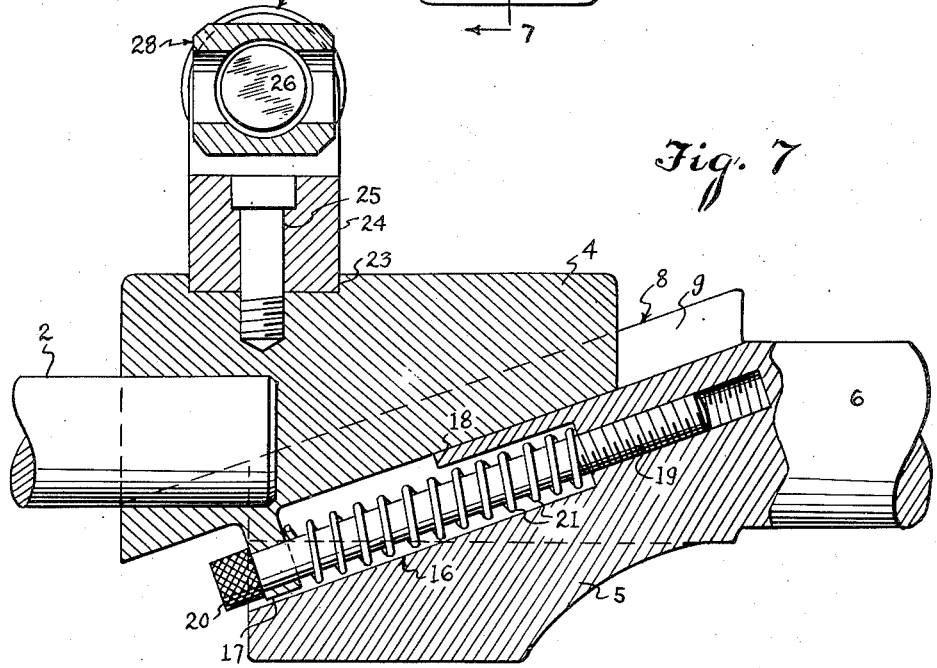
Fig. 7 is a longitudinal vertical section taken on the line 7—7 of Fig. 5.

In Figs. 1 and 2, the main tool slide 7 travels on a stem 34 rigidly mounted in the spindle carrier 35 which is rotative in the headstock 36. These views further show an actuating rod 37 connected to the slide 7. Fig. 2 differs from Fig. 1 in showing a more advanced position of the slide 7 which carries my improved tool and also in showing the rod 29 of Fig. 1 replaced by a bracket 38 fixed on the headstock for encountering the roller 27.

In use of the described tool holder, the same is fed forwardly until the cutter 1 enters the bore or other opening 39 of a rotating piece of work 40 to be recessed. When the cutter is advanced to its predetermined cutting position, the block 28, which has heretofore been riding forward along the rod 29 (Fig. 1), encounters the stop nut 30 or the roller 27 encounters the bracket 38, in either case the holder member 4 being restrained from further advance. As the member 5 continues its advance, the spring 21 is progressively compressed and the member 4 is cammed laterally to first engage the cutter 1 with the wall of the bore 39 and then feed the cutter into such wall, the depth of cut being determined by the camming advance. During initial retraction of the member 5 following cutting of a recess, the member 4 maintains its forward limiting position, compression of the spring 21 however being progressively relieved and the member 4 progressively shifted toward the longitudinal axis of the holder, whereby the cutter is withdrawn from the cut recess. When the lug 17 encounters the head of the screw 19, the members 4 and 5 retract in unison.

Because of the high precision with which the member 4 is laterally cammed deriving from the accurate dove-tailed interconnection of the two members and from avoidance of any lost motion, the described tool permits of close tolerance recessing not heretofore available. Further, the recess may be extended into the wall of a bore or other work opening in a definitely rectangular or other desired angular relation to the wall of such bore. The initial position of the lateral recessing feed may be accurately selected by properly adjusting the screw 19, so that initial clearance from the wall to be recessed may be minimized with a resultant time saving. The holder is rendered more adaptable to different types of screw machines and suited to a greater variety of jobs by the provision for limiting advance of the member 4 either by the block 28 acting tensionally on a rod 29 or by the roller 27 contacting a fixed bracket 38. Adapting the bracket 24 for an end-for-end reversal also facilitates setting up the tool for different production jobs, such reversal effecting a lateral shifting of the stop elements 27 and 28 to accommodate one of them to require location of a coacting relatively fixed stop. Housing the spring 21 and its adjusting screw 19 fully within the tool holder is a desirable feature, protecting these parts from damage, and preventing their being fouled with cuttings or dirt.

A quite powerful spring 21 is preferred to afford use of the tool for internal facing as well as recessing. Upon use of a facing cutter the member 4 would retract under working stress if the spring were inadequate to resist such stress.

Universal pivoting of the rear end of the rod 29 is useful in permitting such rod to assume a progressively increased inclination as its forward end is outwardly shifted from the axis along which the tool slides. Also such pivoting permits the rear end of said rod to be offset in any convenient direction from the front end.

While the improved tool holder has been shown and described in an application to a screw machine, it is also readily applicable to numerous other machine tools, such as lathes, drill presses and boring mills. While the members 4 and 5 have been referred to as upper and lower members, in practice either of these members may be uppermost, and in fact, their meeting faces may be in any desired plane.

What I claim is:

1. A recessing tool holder comprising a supporting and a supported member, means for guiding the supporting member in a rectilinear travel to and from the work and for restraining such member from rotation, said members having contiguous cam faces acutely divergent to the direction of said travel, means for interconnecting said members and guiding them in a relative travel along said faces in the direction of said divergency, a cutter carried by the supported member, a spring housed in one of said members reacting between the two members to urge the supported member toward the work, means for regulably limiting response of the supported member to said spring, and stop-engaging means carried by the supported member, effective upon encountering a stop during advance of the tool holder toward the work, to induce a relative travel of the members along said cam faces, whereby the supported member is shifted transversely to the tool advance to give effect to the cutter.

2. A recessing tool as set forth in claim 1, said spring being coiled and elongated in substantial parallelism with said cam faces, the member housing said spring having an elongated chamber receiving the spring, and the other of said members having on its cam face an abutment for the spring projecting into said chamber through the cam face of the spring-housing member.

3. A recessing tool comprising a supporting and a supported member, means for guiding the supported member in a rectilinear travel to and from the work, said members having contiguous cam faces acutely divergent to the direction of travel, means for interconnecting said members and guiding them in a relative travel along said faces in the direction of said divergency, a cutter carried by the supported member, a coiled spring housed in one of said members and having one end abutting such member, said spring being elongated substantially in the direction of said divergency, an abutment on the other of said members for the other end of said spring, whereby said spring urges said members in one direction of said relative travel, and a stop on the spring-housing member limiting response of the other member to said spring and adjustable to regulate such response.

4. A recessing tool as set forth in claim 3, said stop being fixed on a screw extending freely through said abutment and the coiled spring and threaded into the spring-housing member.

MICHAEL J. SCHLITTERS.

REFERENCES CITED

The following references are of record in the file of this patent:

UNITED STATES PATENTS

| Number | Name | Date |
| --- | --- | --- |
| 649,907 | Brophy | May 22, 1900 |
| 1,179,361 | Sparks | Apr. 11, 1916 |
| 1,449,475 | Wheeler | Mar. 27, 1923 |
| 1,771,534 | Garrard | July 29, 1930 |
| 1,794,390 | Trobeck | Mar. 3, 1931 |
| 1,782,817 | Root | Aug. 23, 1932 |
| 2,337,530 | Loudon et al. | Dec. 21, 1943 |